(12) United States Patent
Kandala et al.

(10) Patent No.: US 6,977,972 B1
(45) Date of Patent: Dec. 20, 2005

(54) METHOD OF HYBRID SOFT/HARD DECISION DEMODULATION OF SIGNALS WITH MULTILEVEL MODULATION

(75) Inventors: Srinivas Kandala, Clark County, WA (US); V. Srinivasa Somayazulu, Washington County, OR (US); Chan K. Park, Washington County, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 549 days.

(21) Appl. No.: 09/614,784

(22) Filed: Jul. 12, 2000

(51) Int. Cl.$^7$ .......................... H04L 27/22; H04L 27/00
(52) U.S. Cl. ....................................... 375/332; 341/324
(58) Field of Search ........................ 329/304; 375/341, 375/262, 316, 322, 324, 329, 332, 340; 714/794, 714/795

(56) References Cited

U.S. PATENT DOCUMENTS

| | | | |
|---|---|---|---|
| 5,134,635 A | | 7/1992 | Hong et al. |
| 5,271,042 A | | 12/1993 | Borth et al. |
| 5,432,818 A | * | 7/1995 | Lou .............................. 375/324 |
| 6,115,435 A | * | 9/2000 | Harada et al. ............... 375/341 |
| 6,243,423 B1 | * | 6/2001 | Sakoda et al. ............... 375/262 |

OTHER PUBLICATIONS

A. Viterbi et al., "Performance of Power-Controlled Wideband Terrestrial Digital Communication", IEEE Transactions on Communications, vol. 41, No. 4, Apr. 1993, p. 559-569.*

Le Goff et al., Turbo-codes and High Spectral Efficiency Modulation, Proc. of ICC, IEEE, 1994, p. 645-649.

* cited by examiner

*Primary Examiner*—Chieh M. Fan
*Assistant Examiner*—Jason M. Perilla
(74) *Attorney, Agent, or Firm*—Chernoff, Vilhauer, McClung & Stenzel

(57) ABSTRACT

The performance of forward error correction decoders for digital communication systems can be improved if soft information relating the reliability of the value representing the demodulated signal is provided to the decoder with a value for the signal. On the other hand, soft information increases the quantity of information that must be processed, increasing the cost and complexity of the decoder.

4 Claims, 3 Drawing Sheets

METHOD OF HYBRID SOFT/HARD DECISION DEMODULATION OF SIGNALS WITH MULTILEVEL MODULATION

BACKGROUND OF THE INVENTION

The present invention relates to demodulation of multilevel signals and, more particularly, to methods of demodulating multilevel signals to obtain a binary value for a signal that includes bits produced by hard and soft decisions.

The goal of a digital communication system is to deliver information represented by a sequence of binary symbols through a physical communication channel to a receiver. The symbols are mapped by a digital modulation process into signals selected to match the characteristics of the communication channel. Multilevel digital modulation processes are often used in applications requiring a high bit rate in a channel of limited bandwidth. Multilevel modulation maps symbols into a plurality of waveforms so that any time the transmitted signal represents a plurality of symbols. Phase-shift keying is a linear modulation method used in multilevel digital modulation. Two equal sinusoidal components (in-phase (I) and quadrature (Q)) at the same frequency, but 90° apart in phase, are added to produce a single wave at the same frequency with four unique phases (90° apart) corresponding to the I and Q components of the signal. Each of the sinusoidal components can represent either a digital "1" or a digital "0" as designated by a 180° phase shift. Phase-shift keying may also be combined with pulse amplitude modulation (PAM) in a modulation technique known as quadrature amplitude modulation or QAM in which each of the phases has an amplitude that is the vector sum of the amplitudes of the in-phase and quadrature components. A two-bit quantization of both the in-phase and quadrature components results in 16 unique states of the carrier of each modulated symbol permitting transmission of four bits per symbol. The resulting combinations of in-phase and quadrature components are referred to as a signal constellation and the number of signals in the constellation indicates the order of the digital modulation. For example, 16-QAM indicates a constellation of 16 signal vectors with each of the I and Q components represented by two bits and 64-QAM indicates a three-bit quantization of both I and Q to produce 64 unique signal levels or a 64 signal vector constellation.

A second important aspect of a digital communication system is the detection and correction of bit errors that result from the transfer of the information in an imperfect medium. In some systems, errors are detected and corrected by retransmission of the information. In other systems, retransmission is not acceptable and error detection is combined with error correction using forward error correction (FEC) coding techniques. With FEC additional symbols are systematically inserted into the data stream to add redundancy to the transmission. In addition, adjacent individual bits of the transmitted message may be dispersed in the data stream by interleaving. Interleaving reduces susceptibility to burst errors that can corrupt sequential bits in the stream. FEC coding commonly employs block coding, convolutional coding, or turbo-coding which interleaves the data stream between a plurality of encoders.

At the receiver, the acquired signals are demodulated and decoded. The FEC decoder applies an algorithm to the demodulated signal to determine the most likely symbols of the original message even though the acquired signal may include data errors. The Viterbi algorithm is a commonly used and efficient algorithm for decoding convolutional coded or turbo-coded bitstreams. The convolutional coding and turbo-coding processes can be represented by a trellis diagram where each node of the diagram represents a coding interval. The decoder attempts to retrace the path through the trellis take by the encoder in encoding the original data. The Viterbi algorithm relies on calculation of a path metric or measure of the likelihood for all paths through the trellis that could have been taken at each coding interval. The decoder then discards all but the most likely path and initiates decoding of the next interval. The path metrics can be computed using binary or hard decision information related to the modulation symbol. Alternatively, the bits of the modulation symbol obtained from the demodulator may be mapped into values reflecting an estimate of the received symbol and an indication of the reliability of this estimate or soft decision information. For example, if a signal employs three-bit quantization, two of the bits might be used as a reliability measure. It is well known that FEC decoders such as the Viterbi decoder make better decisions if information about the quality of the acquired signal (soft information) is available during decoding.

Hong et al., U.S. Pat. No. 5,134,635, describe a soft-decision Viterbi decoder that uses channel state information to decode convolutionally encoded information transmitted with a 16-QAM multilevel signal. Bit metrics are produced for each of the four bits of the demodulated acquired signal. The two bits of the bit metric reflect a level of reliability or likelihood that the corresponding bit of the demodulated signal is either a binary "1" or binary "0". The lower the value of the specific bit metric the higher the likelihood that the corresponding bit is correctly represented by the value specified for the bit. The Viterbi decoder makes the final determination of the value of each binary digit of the data stream from the sequence of demodulated signal values and the corresponding bit metrics. However, the method is limited to extraction of soft decision information from a 16-QAM multilevel signal. The method is not generalized for use with higher order QAM signal constellations or with PSK modulated signals.

Le Goff et al., in a paper entitled TURBO-CODES AND HIGH SPECTRAL EFFICIENCY MODULATION, Proc. of International Communications Conference, pp. 645–649, IEEE, 1994, disclose a coding scheme combining turbo-codes and multilevel signal modulation. A method of approximating bit metrics or log likelihood ratios (LLRs) for the constituent bits of a QAM or PSK symbol is described. This method provides a generalized method of extracting soft decision information from the modulated signal that produces the results of Hong et al. when applied to 16-QAM signals. The method yields soft information for each of the bits of the demodulated signal. While the availability of information based on soft decisions is beneficial to the decoding process, soft information increases the quantity of data that must be processed during decoding which increases the cost and complexity of the decoder. In some applications, the additional cost and complexity of the decoder may not be justified. Satisfactory decoding may be accomplished with bits obtained by a mixture of hard and soft decisions concerning the multilevel signal. The method of LeGoff et al. does not provide for a demodulated signal that is represented by a mixture of bits based on hard and soft decisions.

What is desired, therefore, is a method of demodulating a multilevel, acquired signal to produce a binary representation of the signal comprising bits resulting from both hard and soft decisions concerning the value of the acquired signal.

SUMMARY OF THE INVENTION

The present invention overcomes the aforementioned drawbacks of the prior art by providing a method of demodulating a multilevel signal comprising the steps of assigning a value to a bit representing the demodulated signal; identifying at least one signal constellation vector proximate to the multilevel signal; and determining a reliability measure for the bit of the demodulated signal if the bit occupies a bit position corresponding to a bit position of the proximate constellation vectors occupied by a bit of varying value. A set of at least one vector of a signal constellation proximate to the multilevel signal is identified. If a bit occupying a bit position in the set of proximate vectors is constant, a hard decision is made and a value assigned to the corresponding bit of the demodulated signal. On the other hand, if the bit occupying a bit position in set of the proximate vectors varies, a value and a measure of the reliability of that value or a soft value are assigned to the corresponding bit of the demodulated signal. The resulting demodulated signal is a mixture of "hard" and "soft" bits if the acquired signal has at least one phase component with a value within the limits of the signal constellation.

The present invention also discloses a method of demodulating a multilevel signal comprising comparing a reliability of at least two bits of a demodulated multilevel signal; assigning a hard decision value to a bit associated with a greater reliability; and assigning a soft decision value to a bit associated with a lesser reliability. In addition, the number of bits of the demodulated multilevel signal having hard values and soft values can also be predetermined by setting a range for the measure of reliability having limits equaling the desired number of bits to be produced by soft decisions.

The foregoing and other objectives, features and advantages of the invention will be more readily understood upon consideration of the following detailed description of the invention, taken in conjunction with the accompanying drawings.

DETAILED DESCRIPTION OF THE PREFERRED EMBODIMENT

Figure 1:
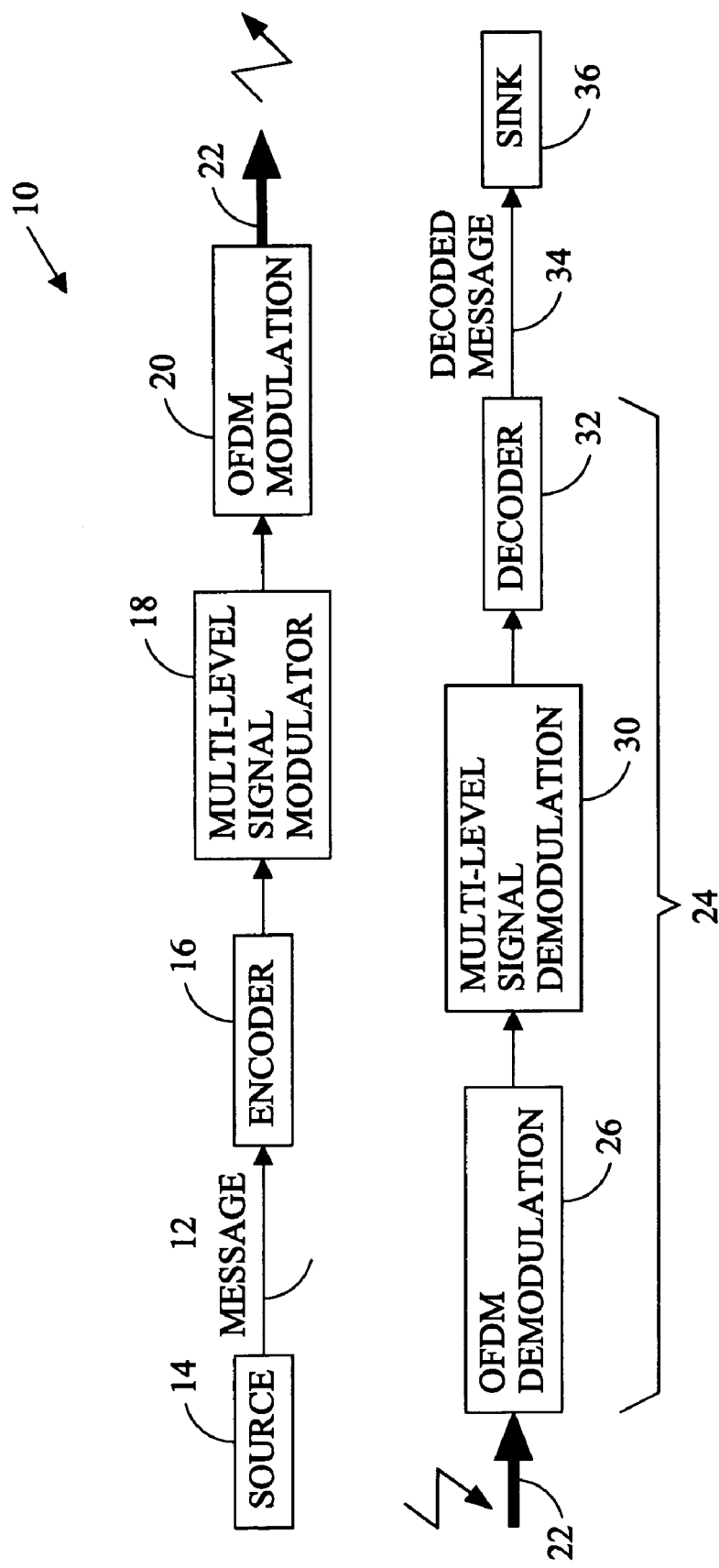
FIG. 1 is a block diagram of a wireless communication system.

A block diagram of an exemplary digital wireless local area network (WLAN) communication system 10 is illustrated in FIG. 1. A message 12 originating at a source 14 is input to an FEC encoder 16 where additional bits are inserted into the data stream for forward error correction (FEC). Convolutional codes, block codes, and turbo-codes are common coding methods for FEC. In addition to coding, interleaving may be incorporated in the FEC technique to disperse adjacent bits of the data stream in the transmitted data stream. The encoded data is converted to a multilevel modulated signal in a multilevel signal modulator 18. Multilevel modulation schemes include phase key shifting (PSK) modulation and quadrature amplitude modulation (QAM). The result is a signal having analog real and imaginary phase components.

In the communication system 10, the multilevel modulated signals are further modulated in an Orthogonal Frequency Division Multiplexing (OFDM) modulator 20. Obstructions in the transmission area can result in the transmitted signal traveling over multiple paths in the communication channel 22. Multiple versions of the signal can interfere with each other making it difficult to extract the original message. OFDM applies an inverse discrete Fourier transform to the signal before transmission to reduce the effects of multiple paths in the communication channel 22. The embodiment of the communication system 10, including an OFDM modulator, is provided for purposes of illustration only. The present invention may be exploited in communication systems that include other multilevel modulation methods.

Figure 2:
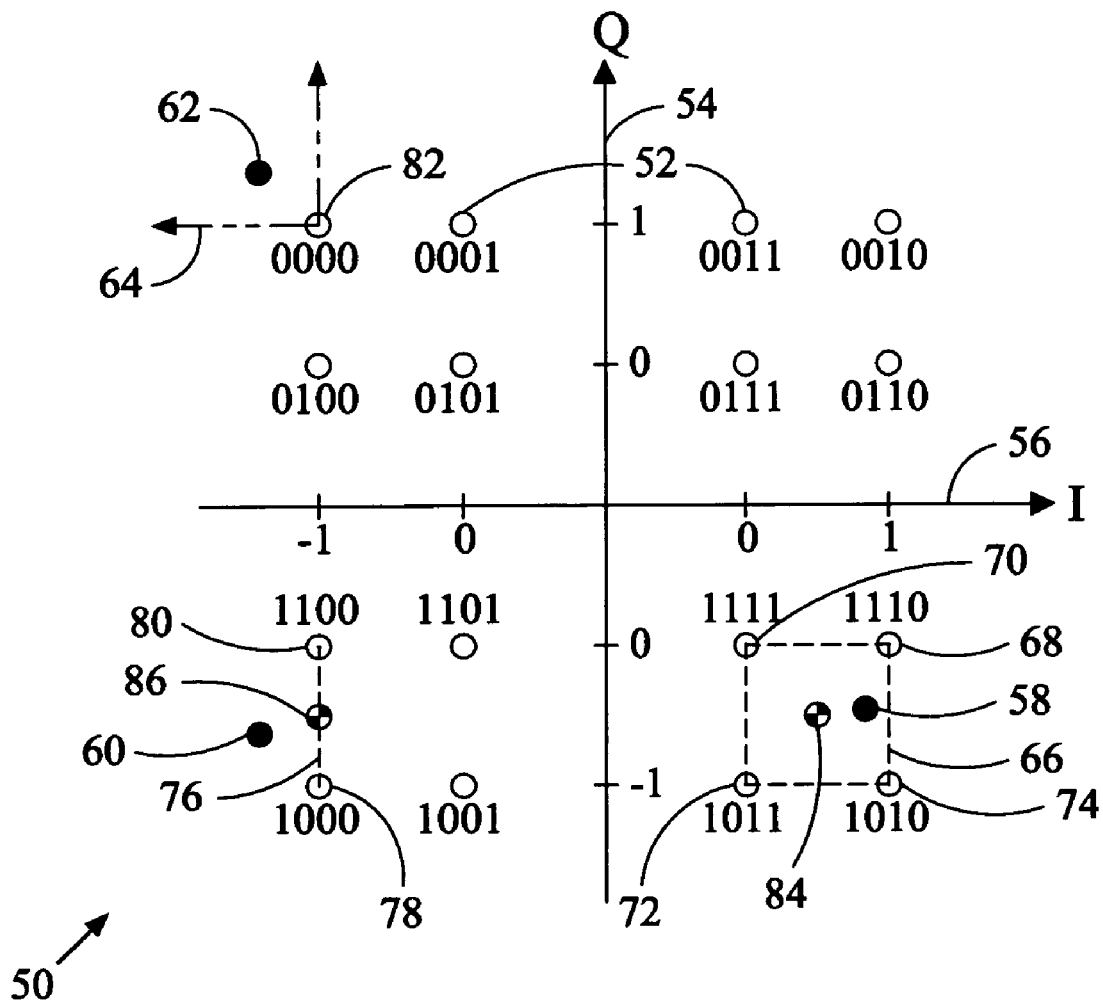
FIG. 2 is an illustration of a signal constellation for a 16-QAM multilevel signal including a plurality of acquired multilevel signals.
Figure 3:
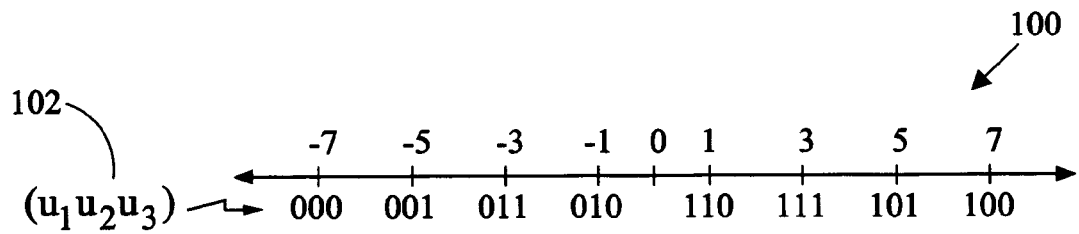
FIG. 3 illustrates bit mapping of an eight level pulse amplitude modulated (8-PAM) symbol.

At the receiver 24 (indicated by a bracket) an inverse fast Fourier transform is applied to the received signal in an OFDM demodulator 26 to produce the acquired version of the multilevel signals. The binary representations of all possible demodulated signals for a digital modulation technique are represented by a constellation of signal vectors. Referring to FIG. 2, a signal constellation 50 for a 16-QAM multilevel signal includes 16 signal vectors 52 arrayed along quadrature (Q) 54 and in-phase (I) 56 axes. Each signal vector 52 of the 16-QAM signal constellation 50 is represented by four bits with two bits representing the level of the Q component and two bits representing the level of the I component. As illustrated in FIG. 3, a signal constellation can be arranged in a Gray code arrangement where only one bit differs between adjacent signal vectors 52. Similarly, a signal constellation for 64-QAM modulation would include 64 signal vectors with the Q and I components each represented by three bits. Acquired multilevel signals from the OFDM demodulator 26 are defined by the values of their analog quadrature (Q) 54 and in-phase (I) 56 components. In the multilevel signal demodulator 30 a hybrid soft-hard decision demodulation method is applied to the multilevel signal to produce a binary representation of the acquired signal including soft decision information expressing the level of reliability concerning the correctness of certain bits of the digitized demodulated signal. The digital representation of the demodulated acquired signal is forwarded by the multilevel signal demodulator 30 to a decoder 32 that decodes the signal to produce the error corrected decoded message 34 to be consumed by the information sink 36. A Viterbi decoder is often used to decode the convolutional codes or turbo-codes common in wireless communication systems. However, sequential decoders, MAP algorithm decoders, or other decoders may be used for decoding these codes. Other types of appropriate decoders would be used with other types of FEC coding.

In addition to the 16 possible signals represented by signal vectors of the signal constellation 50, three exemplary acquired signals 58, 60, and 62 are illustrated in FIG. 2. The acquired signals are located relative to the constellation by the values of their in-phase and quadrature signal components which are obtained from the outputs of quadrature and in-phase demodulators in the multilevel signal demodulator 30. A first exemplary signal 58 has quadrature and in-phase components within the limits of the Q and I values of the signal vectors of the constellation 50. A second exemplary acquired signal 60 is located outside of the constellation 50, but has a quadrature component with a value within the limits of the quadrature values of the vectors of the constellation 50. Likewise, an acquired signal could be located outside of the constellation but have an in-phase component within the limits of the constellation 50. A third exemplary acquired signal 62 is located outside of the constellation 50 and in a region 64 where both its in-phase and quadrature components exceed the limits of the corresponding components of the constellation 50.

In a first hybrid soft-hard demodulation method of the present invention, bit signals or bits of the binary representation of the demodulated acquired signal are assigned on the basis of a relationship of the acquired signal and proximate vectors of the appropriate signal constellation. A nearest neighborhood of the constellation 50 is defined for an acquired signal. If the acquired signal has quadrature and in-phase components within the limits of Q and I components for the constellation, the neighborhood is defined by four proximate vectors of the constellation. For the exemplary acquired signal 58, the associated neighborhood 66 is defined by the four proximate vectors 68, 70, 72, and 74. On the other hand, if one of the components of the acquired signal has a value exceeding a limit of the constellation, the neighborhood is defined by two proximate vectors of the constellation. For example, the acquired signal 60 has an in-phase component with an absolute value exceeding the absolute value of the limit of the in-phase component of the constellation 50 and the neighborhood is defined by the line 76 connecting the two nearest vectors 78 and 80 of the constellation 50. The acquired signal 62 illustrates a third case where both phase components of the acquired signal have values exceeding the limits of the constellation 50. If the absolute value of both phase components of the acquired signal exceed the absolute value of the limits of the components in the constellation, the neighborhood is defined by a single proximate vector. In the case of the acquired signal 62 the neighborhood is defined by the vector 82. In general, the vectors of the constellation 50 defining the neighborhood associated with an acquired signal comprise a signal vector having both in-phase and quadrature phase components of a maximized absolute value for constellation vectors that does not exceed the absolute value of the in-phase and quadrature components of the acquired signal; any constellation vector having one phase component with a maximized absolute value that does not exceed the corresponding phase component the acquired signal and a second phase component having minimized absolute value for constellation vectors which is not less than the corresponding phase component of the acquired signal, and any vector of the constellation for which phase components have minimized absolute values which are not less than values of the corresponding phase components of the acquired signal.

Once the neighborhood has been identified, the signal vectors defining the neighborhood are examined to determine which bits remain constant and which bits vary for the set of proximate vectors. For example, for the neighborhood 66 the bit signals occupying the first (most significant bit) and third bit positions are constant while the second and fourth (least significant bit) bits vary for the neighborhood defining vectors or proximate vectors 68,70,72, and 74. Since the constellation 50 has a Gray code arrangement, neighboring vectors vary by a single bit. As a result, only the second bit varies for the two vectors 78 and 80 defining the neighborhood 76 related to acquired signal 60. Since the neighborhood related to acquired signal 62 is defined by a single vector 82 all bits are constant for the set of neighborhood defining vectors.

Bits that vary or remain constant can be identified and stored for each set of neighborhood defining or proximate vectors in the signal constellation. On the other hand, logic circuitry can be used to identify the bits of neighborhood defining vectors that vary. Two n/2-tuple vectors, $b_I$ and $b_Q$, can be defined as the Gray code, binary equivalents of the signal components $x_f$ and $y_f$, which are equal to the largest valued (maximized) in-phase (I) and quadrature (Q) components, respectively, of the constellation that are less than the corresponding I and Q components of an acquired signal. In addition, $b_j(i)$ with j=I or Q is defined to represent the $i^{th}$ element. For a 16-QAM signal constellation, the bit signals that vary in the set of neighborhood defining vectors are identified when the following Boolean expressions corresponding to the first (most significant bit) and second bit signals respectively, are "true":

$b'_j(0) \cdot b_j(1)$, and $b'_j(0) \cdot b'_j(1) + b_j(0) \cdot b_j(1)$ where $b'_j$ is the complement of $b_j$, "·" is the logical "AND" operator and "+" is the logical "OR" operator.

For 64-QAM, the varying bits can be identified from the expressions $b'_j(0) \cdot b_j(1) b'_j(2)$, $b'_j(0) \cdot b'_j(1) \cdot b'_j(2) + b_j(0) \cdot b_j(1) \cdot b_j(2)$, and XNOR $b_j(0), b_j(1), b_j(2)$ corresponding respectively to the first (most significant bit), second and third bits of the signal vector.

If the value of a bit occupying a bit position does not vary for a set of neighborhood defining vectors related to an acquired signal, that value is assigned to the bit occupying the corresponding bit position of the acquired signal. In addition, if the value of the bit is binary "0" a soft value of "−1" is assigned to the second bit of the pair specifying the component and if the value of the bit is "1" a soft value of "+1" is assigned to the corresponding bit. As a result, hard decision values are assigned to bits of the acquired signal corresponding to bits occupying positions in the neighborhood defining vectors with values that do not vary for the set of vectors.

On the other hand, if the value in a bit position of the neighborhood defining vectors varies for the vectors of the set, a soft decision value or reliability measure is assigned to the corresponding bit of the acquired signal. The reliability measure is a function of the relative positions of the acquired signal and the center of gravity of the associated neighborhood. The center of gravity of a neighborhood is a point equidistant from the applicable neighborhood defining vectors. For example, for the neighborhood 66 the center of gravity 84 is located equidistant from the four neighborhood defining vectors 68, 70, 72, and 74. Likewise, the center of gravity 86 of the neighborhood 76 is located at the midpoint of the line connecting the neighborhood defining vectors 78 and 80.

The values of the phases or phase coordinates of each of the centers of gravity of the possible neighborhoods of a signal constellation can be predetermined and stored. Alternatively, the center of gravity of a neighborhood can be computed from the components of the acquired signal. For example, the total number of bits describing a point for a q-ary QAM signal constellation is given by:

$n = \log_2 z$ where:
n=the number of bits
z=the number of levels of modulation

If the acquired signal, as expressed by its components, is vector (x,y) the neighborhood defining vectors of a signal constellation can be determined from a floor function where $x_f = \lfloor x \rfloor$ and $y_f = \lfloor y \rfloor$ and $\lfloor x \rfloor$ and $\lfloor y \rfloor$ are defined as the maximum value of the in-phase or quadrature component of a vector of the signal constellation that is less than the corresponding value of the component of the acquired signal. For example, for the 16-QAM constellation 50 $x_f = 1$ if the acquired signal component (x) equals 2.5. If the acquired signal is outside of the constellation, the floor function is adjusted to produce component values locating the center of gravity of the neighborhood to a point within the constellation. If $x_f > 2^{n/2} - 1$, $x_f$ is set to $x_f = 2^{n/2} - 1$; or if $x_f < -(2^{n/2} - 1)$, $x_f$ is set to $x_f = -(2^{n/2} - 1)$ to adjust the coordinate of the center of gravity to the boundary of the constellation. Likewise, if $y_f > 2^{n/2} - 1$, $y_f$ is set to $y_f = 2^{2/n}$; or if $y_f < -(2^{n/2} - 1)$, $y_f$ is set to $y_f = -(2^{n/2} - 1)$ to adjust the y coordinate of the center of gravity to the outer limit of the constellation 50. For acquired signals, such as signal 58, having coordinates within the constellation, the coordinates of the center of gravity of the nearest neighborhood are:

$$c_I = x_f + 1$$

$$c_Q = y_f + 1$$

where:
$c_I$ = the in-phase coordinate of the center of gravity
$c_Q$ = the quadrature coordinate of the center of gravity If a signal, such as acquired signal 60, has one coordinate located beyond the limits of the constellation then only the one computed coordinate of the center of gravity would be required. In the case of an acquired signal, such as signal 62, having both coordinates outside the limits of the constellation, it is not necessary to locate the center of gravity because hard values are assigned to all bit signals.

Soft values are provided for bits of an acquired signal that occupy bit positions corresponding to the bits of the set of neighborhood defining vectors having varying values. The soft values express a relationship between the relative positions of the acquired signal and the nearest vectors of the signal constellation which is a measure of the reliability of the demodulator's estimation of the value of the bit in the demodulated signal. A measure of reliability can be expressed as the distance between the in-phase and quadrature coordinates of the acquired signal and the in-phase and quadrature coordinates the center of gravity of the associated neighborhood of the signal constellation:

$x - c_I$ (for the in-phase component bit);

$y - c_Q$ (for the quadrature component bit);

where:
x = the acquired in-phase signal component
y = the acquired quadrature signal component
$c_I$ = the in-phase coordinate of the neighborhood center of gravity
$c_Q$ = the quadrature coordinate of the neighborhood center of gravity Using the first hybrid demodulation method of the present invention, hard values are assigned to bits of the demodulated signal occupying bit positions corresponding to bits of the nearest vectors of the signal constellation which have a constant value. If a bit representing the nearest vectors of the signal constellation varies, expressing uncertainty concerning the correct value of the acquired signal component, a measure of reliability or soft information is also provided with the value of the demodulated signal to improve the performance of the decoder.

Some of the bits of an acquired signal are more likely to be correct than others. The second hybrid demodulation method of the present invention takes advantage of the relative reliability of the demodulated bits, to provide hard decision values for a predetermined number of the "more reliable" bits of the acquired signal and soft values for the remaining "less reliable" bits. The relative reliability of the bits of the acquired signal is determined by comparing a log likelihood ratio (LLR) for each of the bits.

For example, a 64-QAM multilevel signal comprises an eight level pulse amplitude modulated (PAM) signal for each of the Q and I components. The signal constellation can be separated and each of the PAM signals can be considered separately. The binary representation of the signal constellation for an eight-level, Gray coded PAM signal 100 of the in-phase (X) component of a 64-QAM signal constellation is illustrated in FIG. 3. The quadrature component of the QAM signal would be represented by an identical PAM signal constellation. Each level of the PAM signal is described by a three bit binary number comprising bit signals $u_1$, $u_2$ and $u_3$ 102. Likewise, lesser or higher orders of QAM having square signal constellations are produced by a pair PAM signals which can be represented by an appropriate number of bits. For example, the quadrature and in-phase components of 16-QAM signals are each represented by two bits.

It is known that the log likelihood ratio ($\Lambda$) of the bits of a multilevel signal can be determined from the following expressions:

$$\Lambda(u_{k,1}) = X_k$$

$$\Lambda(u_{k,i}) = 2^{p-l+i-1} |\Lambda(u_{k,i-1})| i = 2, \ldots, p$$

where:
$\Lambda(u_{k,1})$ = the log likelihood ratio of the first bit, $u_1$
$\Lambda(u_{k,i})$ = the log likelihood ratio of the ith bit, $u_i$
$X_k$ = the X component of the acquired signal
p = the number of bits representing the signal component The approximate LLRs for the three bits of the X component of the 64-QAM signal constellation are plotted in FIG. 4. The LLRs of the quadrature (Y) component of the acquired signal could be determined in a similar manner.

If the value of the acquired signal is between ±1, the value of the LLR ($\Lambda_1$) 120 associated with the signal bit, $u_1$, is the smallest of the three LLRs 120, 122, and 124. In other words, the reliability of the prediction for the value of the first bit, $u_1$, is less than the reliability of the predictions of the values of the remaining bits, $u_2$ and $u_3$. Therefore, if a soft decision value is to be assigned to one "least reliable" bit of the three bits of the demodulated signal, the appropriate bit is the most significant bit, $u_1$. For a signal in the range of ±1, the second least reliable bit signal is the least significant bit, $u_3$, because the corresponding LLR ($\Lambda_3$) 122 is less than the LLR ($\Lambda_2$) 124 for the second bit throughout this range of the X component. If a soft decision value is desired for two bits of the acquired signal, the first and third bits of the three bit 64-QAM signal are the two bits exhibiting the least reliability.

Figure 4:
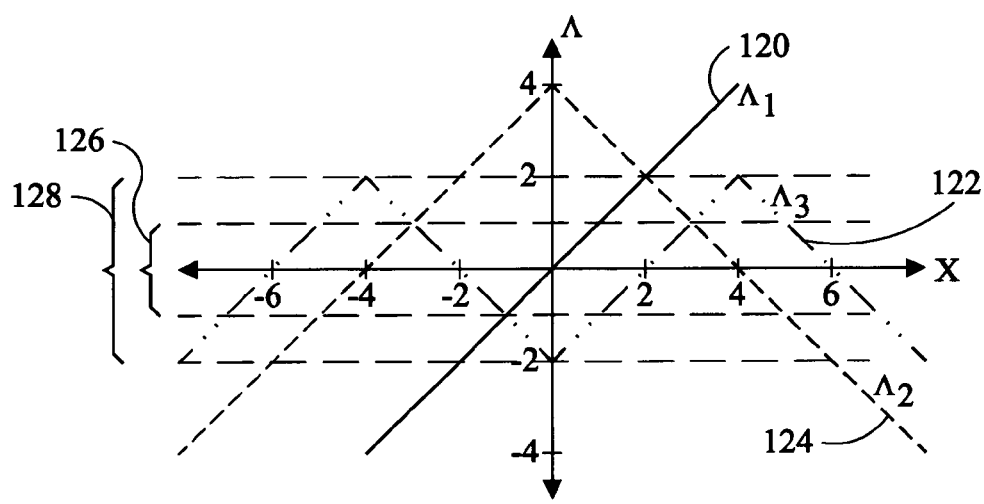
FIG. 4 is a graph of values of the log likelihood ratios for three bits of an 8-PAM symbol.

The inventors further discovered that if the LLRs of an acquired signal are limited to a range of values corresponding to a predetermined number of bits for which soft decision values are desired, hard values will result for all bits having an LLR that equals or exceeds that range. As illustrated in FIG. 4, for an acquired signal between "+1" and "−1," only $\Lambda_1$, associated with the most significant bit ($u_1$), does not exceed a threshold range of ±1 (illustrated by a bracket) 126. Therefore, if soft information is sought concerning a single bit of the 8-PAM signal, a threshold LLR of ±1 would identify $u_1$ as the appropriate bit. Likewise, limiting the LLRs to the range ±2 (illustrated by a bracket) 128 results in a hard decision for the second bit of the acquired signal. Bits one and three having LLRs 120 and 122 within the threshold range are identified for soft decision values. Likewise, for acquired signals within other specified ranges, limiting the LLRs will identify appropriate bits for soft and hard decision values. In general, for multilevel signals of any order ($2^{2p}$-QAM or $2^{2p}$-PAM) limiting the LLRs to a range (±1, ±2, ..., ±$2^{2p-1}$) identifies a corresponding number of the least reliable bits of the demodulated signal. Soft decisions can be applied to these bits and hard decisions applied to the remaining "more reliable" bits. Using the second hybrid method, an optimum mix of bits produced by soft and hard decisions can be obtained by limiting the LLR value to a threshold determined by simulation of the communication system.

All the references cited herein are incorporated by reference.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

What is claimed is:

1. A method of demodulating a multi-level signal comprising:

(a) identifying at least one signal constellation vector proximate to said multilevel signal;

(b) assigning a respective hard decision bit values to individual bits of said multilevel signal occupying corresponding bit positions of said at least one proximate constellation vector having constant value;

(c) assigning respective reliability measures to individual bits of said multilevel signal occupying corresponding bit positions of said at least one proximate constellation vector having varying value: and (d) comparing respective reliability measures of said multilevel signal to a predetermined range, said respective reliability measures being log likelihood ratios; where bits having reliability measures outside the predetermined range are assigned hard decision bit values and bits having reliability measures within the predetermined range are assigned soft decision bit values and the predetermined range is chosen according to a desired mix of hard decision and soft decision bit assignments for bits occupying corresponding bit positions of said at least one proximate constellation vector having varying value.

2. The method of claim 1 where each of said respective log likelihood ratios is limited to a range of values according to the possible number of bits that could be assigned reliability measures.

3. The method of claim 1 where said predetermined range is calculated using a simulation of said method on a communication system.

4. The method of claim 1 where said desired mix is selected to achieve an optimum mix of bits produced by soft and hard decisions.

* * * * *

UNITED STATES PATENT AND TRADEMARK OFFICE
CERTIFICATE OF CORRECTION

PATENT NO. : 6,977,972 B1
APPLICATION NO. : 09/614784
DATED : December 20, 2005
INVENTOR(S) : Kandala et al.

It is certified that error appears in the above-identified patent and that said Letters Patent is hereby corrected as shown below:

Column 7,
Line 16, change "$y_f = 2^{2/n}$" to -- $y_f = 2^{n/2}$ --.

Column 8,
Line 34, change "$\Lambda(u_{k,i}) = 2^{p-l+i-1} |\Lambda(u_{k,i-1})| i = 2, \ldots, p$" to
-- $\Lambda(u_{k,i}) = 2^{p-i+1} - |\Lambda(u_{k,i-1})|, i = 2, \ldots, p$ --.

Signed and Sealed this

Twentieth Day of June, 2006

JON W. DUDAS
*Director of the United States Patent and Trademark Office*